US009776907B2

(12) United States Patent
Bookbinder et al.

(10) Patent No.: US 9,776,907 B2
(45) Date of Patent: Oct. 3, 2017

(54) OPTICAL FIBERS AND PREFORMS WITH ONE STEP FLUORINE TRENCH AND OVERCLAD AND METHODS FOR MAKING THE SAME

(71) Applicant: Corning Incorporated, Corning, NY (US)

(72) Inventors: Dana Craig Bookbinder, Corning, NY (US); Ming-Jun Li, Horseheads, NY (US); Jeffery Scott Stone, Addison, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/852,686

(22) Filed: Sep. 14, 2015

(65) Prior Publication Data

US 2016/0075591 A1 Mar. 17, 2016

Related U.S. Application Data

(60) Provisional application No. 62/050,907, filed on Sep. 16, 2014.

(51) Int. Cl.
*C03B 37/014* (2006.01)
*C03B 37/012* (2006.01)
(Continued)

(52) U.S. Cl.
CPC ...... *C03B 37/01453* (2013.01); *C03B 37/014* (2013.01); *C03B 37/0142* (2013.01);
(Continued)

(58) Field of Classification Search
CPC ............ G02B 6/03694; G02B 6/03644; G02B 6/0365; G02B 6/036; G02B 6/02;
(Continued)

(56) References Cited

U.S. PATENT DOCUMENTS

| 4,102,664 A | 7/1978 | Dumbaugh, Jr. |
| 5,210,816 A * | 5/1993 | Iino ..................... C03B 37/0142 385/123 |

(Continued)

FOREIGN PATENT DOCUMENTS

| WO | 01/83388 | 11/2001 |
| WO | 2013003003 | 1/2013 |

OTHER PUBLICATIONS

International Search Report, issued in connection with corresponding PCT application No. PCT/US2015/049088, dated Dec. 11, 2015.

*Primary Examiner* — Jodi C Franklin
(74) *Attorney, Agent, or Firm* — Robert L. Carlson

(57) ABSTRACT

A method is provided that includes: forming a low-index trench region with a first density; forming an inner barrier layer comprising silica around the trench region at a second density greater than the first density; depositing silica-based soot around the first barrier layer to form an overclad region at a third density less than the second density; inserting a core cane into a trench-overclad structure; forming an outer barrier layer comprising silica in an outer portion of the overclad region at a fourth density greater than the third density; flowing a down dopant-containing gas through the trench-overclad structure to dope the trench region with the down dopant, and wherein the barrier layers mitigate diffusion of the down-dopant into the overclad region; and consolidating the trench-overclad and the core cane.

17 Claims, 6 Drawing Sheets

(51) Int. Cl.
*C03B 37/027* (2006.01)
*G02B 6/036* (2006.01)
*G02B 6/02* (2006.01)

(52) U.S. Cl.
CPC .. *C03B 37/01211* (2013.01); *C03B 37/01446* (2013.01); *C03B 37/01466* (2013.01); *C03B 37/027* (2013.01); *G02B 6/02* (2013.01); *G02B 6/03627* (2013.01); *G02B 6/03638* (2013.01); *C03B 2201/12* (2013.01); *C03B 2201/20* (2013.01); *C03B 2201/28* (2013.01); *C03B 2201/31* (2013.01); *C03B 2201/32* (2013.01); *C03B 2201/40* (2013.01); *C03B 2201/42* (2013.01); *C03B 2203/22* (2013.01); *C03B 2203/23* (2013.01); *C03B 2203/24* (2013.01); *C03B 2207/66* (2013.01); *C03B 2207/70* (2013.01)

(58) Field of Classification Search
CPC  G02B 6/032; G02B 6/03611; G02B 6/03638; G02B 6/03655; G02B 6/02304; G02B 6/03666; G02B 6/0285; G02B 6/03661; G02B 6/03683; C03B 2201/12; C03B 2201/28; C03B 2201/31; C03B 2201/36; C03B 37/014; C03B 2203/23; C03B 2201/20
See application file for complete search history.

(56) References Cited

U.S. PATENT DOCUMENTS

| | | | |
|---|---|---|---|
| 5,342,426 A | 8/1994 | Dumbaugh, Jr. | |
| 6,393,868 B1 | 5/2002 | Krauss et al. | |
| 6,843,076 B2* | 1/2005 | Dawes | C03B 37/01446 65/391 |
| 7,603,015 B2* | 10/2009 | Bickham | G02B 6/02014 385/126 |
| 7,620,282 B2 | 11/2009 | Bickham et al. | |
| 2002/0005051 A1* | 1/2002 | Brown | C03B 19/1407 65/414 |
| 2002/0136515 A1* | 9/2002 | Schaper | C03B 37/01205 385/123 |
| 2003/0046960 A1* | 3/2003 | Dawes | C03B 37/01446 65/391 |
| 2003/0200771 A1 | 10/2003 | Burke et al. | |
| 2006/0021385 A1 | 2/2006 | Cimo et al. | |
| 2006/0039665 A1* | 2/2006 | Matsuo | G02B 6/02009 385/127 |
| 2009/0169163 A1 | 7/2009 | Abbott, III et al. | |
| 2013/0000840 A1* | 1/2013 | Dawes | C03B 37/01211 156/294 |
| 2014/0242375 A1 | 8/2014 | Mauro et al. | |
| 2014/0352361 A1* | 12/2014 | Dawes | C03B 37/012 65/397 |
| 2016/0016839 A1* | 1/2016 | Schwerin | C03B 23/045 501/54 |

* cited by examiner

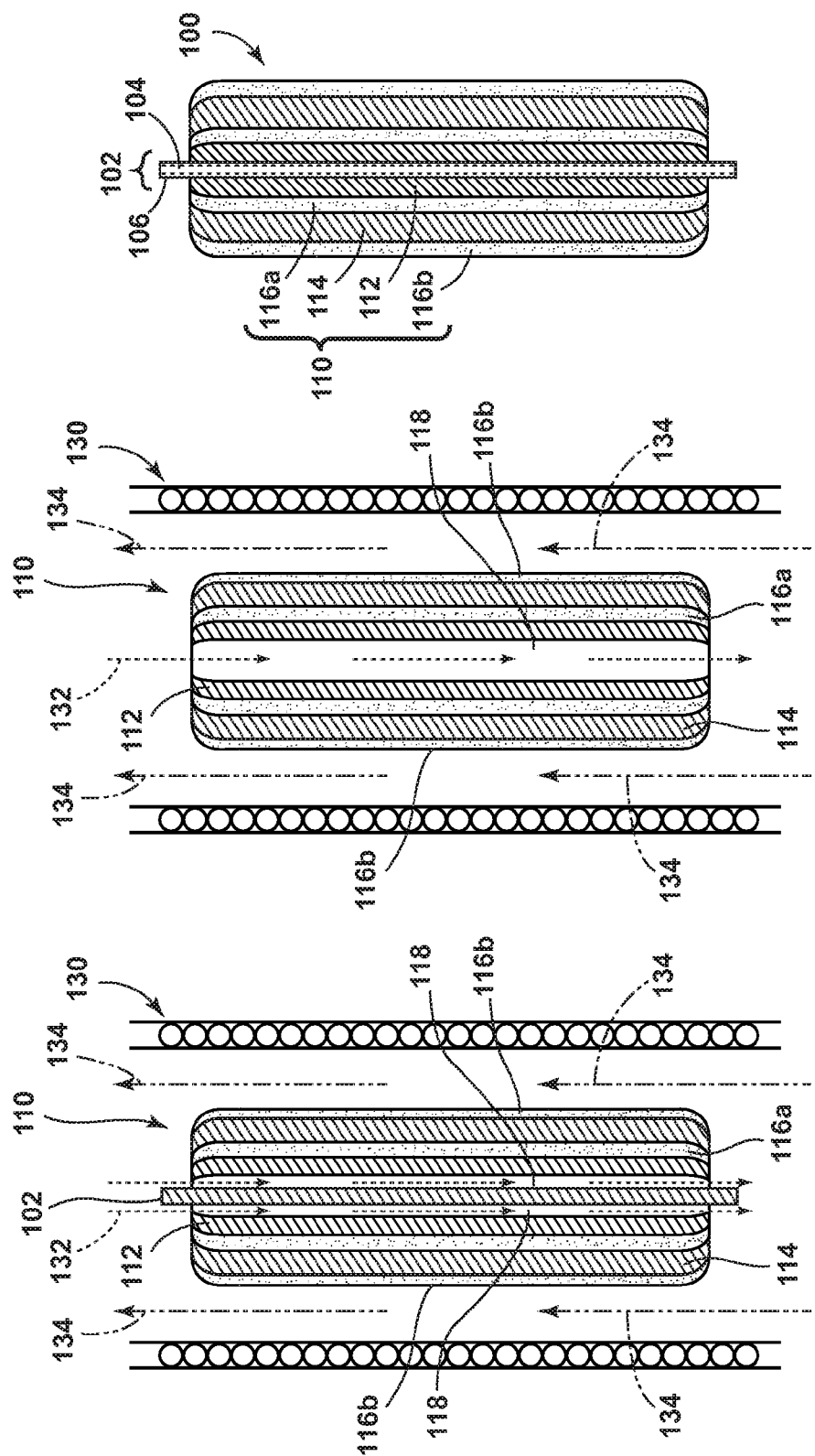

OPTICAL FIBERS AND PREFORMS WITH ONE STEP FLUORINE TRENCH AND OVERCLAD AND METHODS FOR MAKING THE SAME

This application claims the benefit of priority under 35 U.S.C. §119 of U.S. Provisional Application Ser. No. 62/050,907 filed on Sep. 16, 2014 the content of which is relied upon and incorporated herein by reference in its entirety.

BACKGROUND

The present disclosure generally relates to optical fibers and, more specifically, to methods for making optical fiber preforms with low-index trenches.

Optical fibers with low-index trenches surrounding the core of the optical fiber may have improved bending performance and/or larger effective areas relative to comparable optical fibers which are formed without a low-index trench. Accordingly, the improved optical and physical properties of such fibers make them desirable for use in a variety of applications.

The formation of the low-index trench around the core of the optical fiber adds additional steps to the process of making an optical fiber preform and, as a result, adds significant costs to the process of making an optical fiber. Specifically, the low-index trench can be formed by depositing silica-based soot around the core portion of the optical fiber and doping the silica-based soot with a down-dopant which decreases the index of refraction of the consolidated silica-based soot (i.e., silica-based glass) relative to the core portion of the optical fiber. However, to prevent the contamination of adjacent portions of the preform with the down-dopant, the low-index trench is separately formed and consolidated directly on the core portion of the optical fiber after the core portion has been consolidated and prior to depositing the overclad portion of the fiber. Specifically, the core portion of the optical fiber preform is first formed and consolidated to solid glass. Thereafter, the low-index trench portion is deposited around the core portion and then doped and consolidated in a separate step to prevent the dopant from diffusing into the core portion and the overclad portion. Finally, the overclad is formed around the low-index trench layer and consolidated in yet another step.

In other processes for making optical fibers with less manufacturing steps, an overclad can be formed before the trench layer has been created and any consolidation steps associated with cladding region. Doping is then performed to create the low-index trench layer and the low-index trench and overclad layers are consolidated at the same time. While these approaches can save manufacturing time and cost, there are problems associated with doping the preform with the overclad in place. Notably, some of the doping precursor materials (e.g., $SiF_4$) can be introduced into regions of the overclad outside of the intended low-index trench region. As a result, the optical properties of the fibers can be adversely affected by the presence of the index-lowering agents within the overclad region outside of the low-index trench region intended to be doped by the index-lowering agents.

Accordingly, a need exists for alternative methods of forming an optical fiber preform having a low-index trench region surrounding its core portion that are efficient and not prone to doping in regions of the preform outside of the low-index trench region.

SUMMARY

According to an aspect of the disclosure, a method for forming an optical fiber preform is provided that includes the steps: depositing silica-based soot on a bait rod to form a low-index trench region, wherein the silica-based soot is deposited such that the trench region has a first density; forming an inner barrier layer comprising silica around the trench region, wherein the inner barrier layer has a second density greater than the first density; depositing silica-based soot around the first barrier layer to form an overclad region of the optical fiber preform at a third density, wherein the second density is greater than the third density; and removing the bait rod from a central channel of a trench-overclad structure that comprises the trench region, the inner barrier layer and the overclad region. The method also includes the steps: inserting a core cane into the central channel of the trench-overclad structure after the step for removing the bait rod; forming an outer barrier layer comprising silica in an outer portion of the overclad region, wherein the outer barrier layer has a fourth density greater than the third density; flowing a down dopant-containing gas through the central channel of the trench-overclad structure after the step for inserting the core cane, wherein the trench-overclad structure is sufficiently heated to dope the trench region with the down dopant, and further wherein the barrier layers mitigate diffusion of the down dopant into the overclad region; and consolidating the trench-overclad structure and the core cane after the step for inserting the core cane into the optical fiber preform.

According to an aspect of the disclosure, a method for forming an optical preform is provided that includes the steps: depositing silica-based soot on a bait rod to form a low-index trench region, the silica-based soot is deposited such that the trench region has a first density; forming an inner barrier layer comprising silica around the trench region, wherein the inner barrier layer has a second density greater than the first density; and depositing silica-based soot around the first barrier layer to form an overclad region of the optical fiber preform at a third density, wherein the second density is greater than the third density and a trench-overclad structure comprises the trench region, the inner barrier layer and the overclad region. The method also includes the steps: forming an outer barrier layer comprising silica in an outer portion of the overclad region, wherein the outer barrier layer has a fourth density greater than the third density; removing the bait rod from the trench-overclad structure, wherein the remaining step defines a central channel in the trench-overclad structure; flowing a down dopant-containing gas through the central channel of the trench-overclad structure and sufficiently heating the trench-overclad structure to dope the trench region with the down dopant, and further wherein the barrier layers mitigate diffusion of the down dopant into the overclad region; and consolidating the trench-overclad structure having the doped trench region to form a consolidated trench-overclad structure having a central channel. In some implementations, the method is for forming an optical fiber preform and further includes the step: inserting a core cane into the central channel of the consolidated trench-overclad structure. In some aspects, the method may also include drawing the consolidated trench-overclad structure and the core cane together into the optical fiber preform. In further aspects, the method is directed toward forming an optical fiber and, as such, includes a step for drawing and forming an optical fiber from the optical fiber preform.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain principles and operations of the claimed subject matter.

BRIEF DESCRIPTION OF THE DRAWINGS

FIG. 4 schematically depicts the doping and consolidation of the trench-overclad structure of an optical fiber preform according to one or more embodiments shown and described herein;

FIG. 4A schematically depicts the doping and consolidation of the trench-overclad structure of an optical fiber preform according to one or more embodiments shown and described herein;

FIG. 5 schematically depicts the core assembly of an optical fiber preform inserted in the trench-overclad structure of the optical fiber preform according to one more embodiments shown and described herein.

DETAILED DESCRIPTION

Figure 1A:
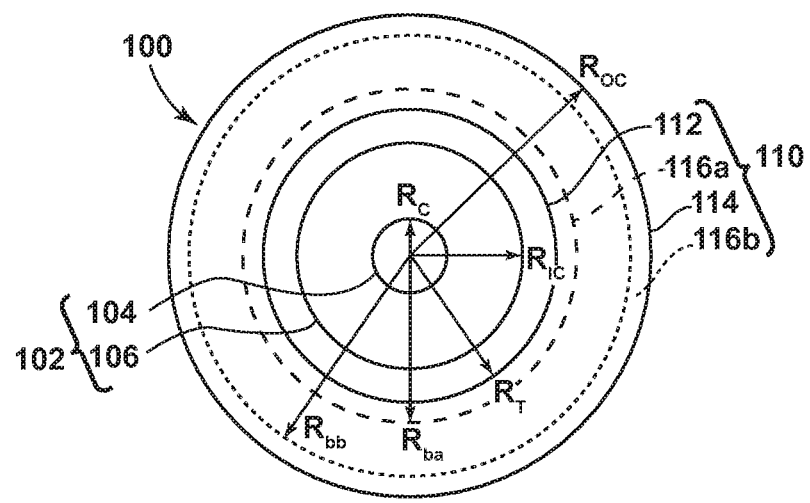
FIG. 1A schematically depicts a cross section of an optical fiber preform according to one or more embodiments shown and described herein.

Reference will now be made in detail to embodiments of methods for forming optical fiber preforms with low-index trenches, examples of which are illustrated in the accompanying drawings. Whenever possible, the same reference numerals will be used throughout the drawings to refer to the same or like parts. One exemplary embodiment of the method for forming an optical fiber preform is schematically depicted in FIGS. 3A-3D. The method generally includes forming a trench-overclad structure on a bait rod by: depositing silica-based soot which is initially substantially free from dopants on a bait rod to form a low-index trench region with a first density; forming a barrier layer comprising silica around the low-index trench region such that the barrier layer has a second density greater than the first density; depositing silica-based soot on the barrier layer to form an overclad region at a third density less than the second density; and forming an outer barrier layer comprising silica in an outer portion of the overclad region at a fourth density greater than the third density. Thereafter, the bait rod is removed from the trench-overclad structure and a core cane is inserted into a central channel of the trench-overclad structure. Next, both structures are consolidated and the low-index trench region is doped with a down-dopant to decrease the index of refraction of the low-index trench region. Other particular methods of forming the optical fiber preform and optical fiber preforms formed according to the aspects of the method of this disclosure will be described in more detail herein with specific reference to the appended figures.

The following terminology will be used herein to described the optical fiber preforms and optical fibers drawn therefrom:

The term "refractive index profile," as used herein, is the relationship between the refractive index or the relative refractive index and the radius of the fiber.

The term "relative refractive index," as used herein, is defined as:

$$\Delta(r)\% = 100 \times [n(r)^2 - n_{REF}^2]/2n(r)^2,$$

where n(r) is the refractive index at radius r, unless otherwise specified. The relative refractive index is defined at 1550 nm unless otherwise specified. In one aspect, the reference index $n_{REF}$ is pure silica glass. In another aspect, $n_{REF}$ is the maximum refractive index of the cladding. As used herein, the relative refractive index is represented by $\Delta$ and its values are given in units of "%," unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and, the region can be said to be raised or to have a positive index.

The terms "up-dopant" and "up dopant" as used herein, refer to a dopant which raises the refractive index of glass relative to pure, undoped $SiO_2$. The terms "down-dopant" and "down dopant" as used herein, refer to a dopant which has a propensity to lower the refractive index of glass relative to pure, undoped $SiO_2$. An up-dopant may be present in a region of an optical fiber having a negative relative refractive index when accompanied by one or more other dopants which are not up-dopants. Likewise, one or more other dopants which are not up-dopants may be present in a region of an optical fiber having a positive relative refractive index. A down-dopant may be present in a region of an optical fiber having a positive relative refractive index when accompanied by one or more other dopants which are not down-dopants. Likewise, one or more other dopants which are not down-dopants may be present in a region of an optical fiber having a negative relative refractive index.

The term "α-profile" or "alpha profile," as used herein, refers to a relative refractive index profile, expressed in terms of $\Delta$ which is in units of "%," where r is the radius and which follows the equation, $$\Delta = \Delta_0 \left[ 1 - \left( \frac{r}{r_0} \right)^\alpha \right],$$

where $\Delta_0$ is the maximum relative refractive index, $r_0$ is the radius of the core, r is in the range $r_i \leq r \leq r_f$, $\Delta$ is as defined above, $r_i$ is the initial point of the α-profile, $r_f$ is the final point of the α-profile, and α is an exponent which is a real number. For a step index profile, the alpha value is greater than or equal to 10. For a graded index profile, the alpha value is less than 10. The term "parabolic," as used herein, includes substantially parabolically shaped refractive index profiles. In some embodiments, the alpha value is about 2 and may vary slightly from a value of 2 at one or more points in the core, as well as profiles with minor variations and/or a centerline dip.

The terms "core cane" and "core assembly" as used herein, refer to a doped silica cane used to make optical fiber. In some embodiments, the core cane or assembly has a doped central region and a silica cladding.

The term "μm" as used herein refers to distance in microns.

The terms "low-index trench region" and "trench region" as used herein, refer to a portion of the optical preform or optical fiber that comprises an index-lowering dopant relative to pure silica. It should also be understood that the "lower index trench region" and "trench region," terms, as used herein, also include interim regions of the fiber or preform that contain doped soot that has not yet been consolidated, but will ultimately define a consolidated region containing the index-lowering dopant.

The terms "inner barrier layer" and "outer barrier layer" as used herein refer to layers within a non-consolidated preform that can reduce, minimize, or eliminate undesirable diffusion of dopants within the preform. It should be understood that these barrier layers will remain within the preform or fiber after consolidation.

Dopant concentrations in the optical preform and/or fiber are expressed herein on the basis of weight (e.g., ppm by weight, ppm (by weight), percent by weight, wt. %), unless otherwise specified.

Concentrations of components in the gas phase are expressed herein on the basis of volume (e.g., ppm by volume, ppm (by volume), percent by volume, vol. %).

The terms "silica-based glass soot," "silica-based soot" and "soot" can be used interchangeably herein and refer to $SiO_2$ or doped-$SiO_2$ particles. It should also be understood that individual soot particles generally have a size of about 5 nm to about 10 microns in diameter and, in some embodiments, about 5 nm to about 1 micron in diameter.

The term "soot preform" refers to an article made of soot particles that has at least some open porosity.

The term "consolidated glass" refers to glass in a closed-pore state. In some embodiments, the glass is void-free.

The term "sintering" refers to the step of going from a porous glass state to a closed-porosity state. In some embodiments, the glass becomes void-free in the sintering step.

The term "optical fiber preform," "consolidated preform," "sintered preform" and "blank" refer to a glass article from which an optical fiber can be drawn. The terms "optical fiber preform(s)" and "optical fiber blank(s)" are used interchangeably.

Referring to FIG. 1A, a cross section of an optical fiber preform 100 (e.g., in a state where preform 100 exists in a consolidated state) according to one or more embodiments described herein is schematically depicted. The optical fiber preform 100 generally comprises a core assembly 102 which is positioned within a trench-overclad assembly 110 (also referred herein as "trench-overclad structure 110"). In the embodiment of the optical fiber preform shown in FIG. 1A, the core assembly 102 generally comprises a core region 104 and an inner clad region 106. The core region 104 is surrounded by and in direct contact with the inner clad region 106. In the embodiments shown and described herein, the core region 104 and the inner clad region 106 are formed from silica, specifically silica-based glass. The optical fiber preform 100 is generally circular-symmetric with respect to the center of the core region 104 and the core region 104 may have a radius $R_C$. The inner clad region 106 surrounds the core region 104 and extends from the radius $R_C$ to the radius $R_{IC}$ such that the inner clad region 106 has a radial thickness $T_{IC}=R_{IC}-R_C$. The core region 104 and the inner clad region 106 are generally formed with specific radial dimensions such that an optical fiber having the desired radial dimensions can be drawn from the optical fiber preform 100.

Figure 1B:
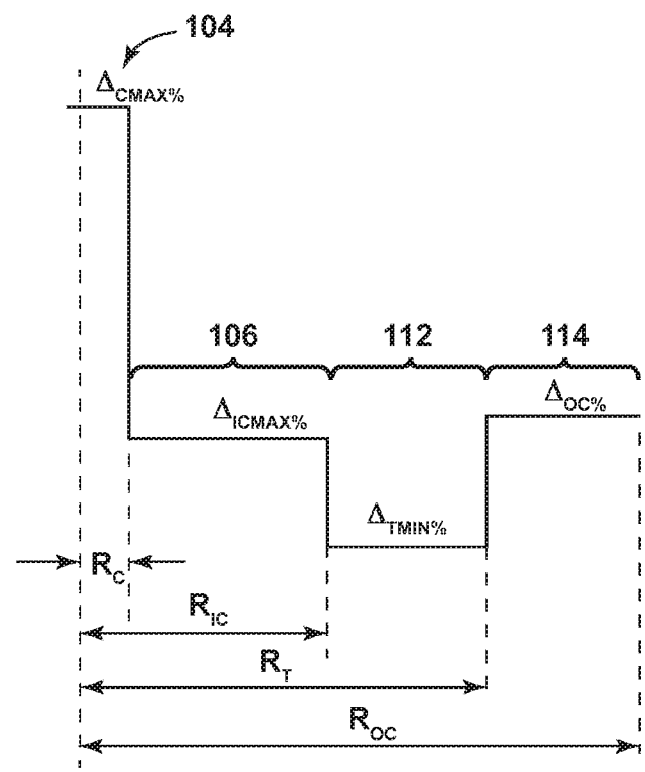
FIG. 1B schematically depicts a relative refractive index profile of the optical fiber preform of FIG. 1A according to one embodiment shown and described herein.
Figure 1C:
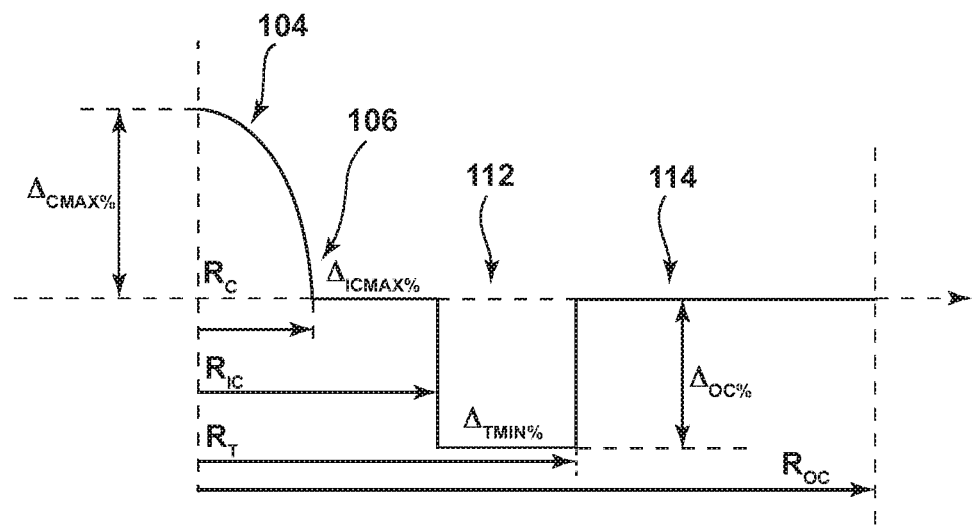
FIG. 1C schematically depicts a relative refractive index profile of the optical fiber preform of FIG. 1A according to one embodiment shown and described herein.

In the embodiments described herein, the core region 104 may have a step index refractive index profile or a graded index profile (i.e., an alpha profile). For example, in one embodiment, the core region 104 has a step index profile, as is schematically depicted in FIG. 1B. In these embodiments, the core region 104 has a maximum relative refractive index $\Delta_{CMAX}\%$ relative to the inner clad region 106 which is substantially uniform through a radial cross section of the core region 104. In other embodiments, the core region 104 may have a graded refractive index with an alpha profile as depicted in FIG. 1C such that the relative refractive index decreases from the center of the core region 104 to the radius $R_C$.

The core region 104 may be formed from pure silica glass ($SiO_2$), such as when the optical fiber preform has a step index of refraction similar to that depicted in FIG. 1B. Alternatively, the core region 104 of the optical fiber preform 100 may be formed from silica-based glass with one or more dopants which increases the index of refraction of the glass core region relative to pure, undoped silica-based glass, such as when the optical fiber preform 100 has a step index profile as depicted in FIG. 1B or a graded index profile as depicted in FIG. 1C. Suitable up-dopants for increasing the index of refraction of the core region include, without limitation, $GeO_2$, $Al_2O_3$, $P_2O_5$, $TiO_2$, $ZrO_2$, $Nb_2O_5$, $Ta_2O_5$, Cl and/or combinations thereof.

In the embodiments described herein, the inner clad region 106 has a maximum relative refractive index percent $\Delta_{ICMAX}\%$ relative to pure silica glass such that $\Delta_{CMAX}\% > \Delta_{ICMAX}\%$. The inner clad region 106 may be formed from pure silica glass ($SiO_2$), silica-based glass with one or more up-dopants which increase the index of refraction (e.g., $GeO_2$, $Al_2O_3$, $P_2O_5$, $TiO_2$, $ZrO_2$, $Nb_2O_5$, Cl and/or $Ta_2O_5$), such as when the inner clad region 106 is "up-doped," or silica-based glass with a down-dopant which decreases the index of refraction, such as fluorine, boron or the like, such as when the inner cladding is "down-doped," so long as the maximum relative refractive index $\Delta_{CMAX}\%$ of the core region 104 is greater than the maximum relative refractive index $\Delta_{ICMAX}\%$ of the inner clad region 106. For example, in one embodiment, the inner clad region 106 is pure silica glass. In yet another embodiment, the inner clad region 106 may comprise silica-based glass up-doped with $GeO_2$, $TiO_2$, or a similar up-dopant.

Referring again to FIG. 1A, the trench-overclad assembly 110 generally comprises a low-index trench region 112 which is surrounded by and in direct contact with an inner barrier layer 116a. The inner barrier layer 116a is, in turn surrounded by and in direct contact with an overclad region 114. Further, an outer barrier layer 116b surrounds the overclad region 114. Each of the low-index trench region 112, the inner barrier layer 116a, the overclad region 114, and the outer barrier layer 116b are formed from silica-based glass.

The low-index trench region 112 is an annular region of silica-based glass which surrounds the core assembly 102. According to some implementations, the as-formed density (e.g., before the low-index trench region 112 has been consolidated) of the low-index trench region 112 is about 0.5 g/cm$^3$. Once consolidated, the low-index trench region 112 assists in improving the bend performance of optical fibers drawn from the optical fiber preform 100 and/or aids in increasing the effective area of the optical fiber. In embodiments where the optical fiber preform 100 includes an inner clad region 106, as depicted in FIG. 1A, the inner clad region 106 is positioned between the core region 104 and the low-index trench region 112 such that the low-index trench region 112 is spaced apart from the core region 104 (i.e., the low-index trench region 112 is not in direct contact with the core region 104). The low-index trench region 112 extends from the radius $R_{IC}$ to the radius $R_T$ such that the low-index trench region has a radial thickness $T_T = R_T - R_{IC}$.

In the embodiments described herein, the low-index trench region 112 generally comprises silica-based glass down-doped to lower the index of refraction of the low-index trench region 112 with respect to pure silica glass. For example, the low-index trench region 112 may be down-doped with fluorine in order to decrease the relative refractive index $\Delta_{TMIN}\%$ of the low-index trench region 112 with respect to pure silica glass. Accordingly, in the embodiments described herein, it should be understood that the relative refractive index of the low-index trench region is less than the relative refractive index $\Delta_{CMAX}\%$ of the core region 104 and the relative refractive index $\Delta_{ICMAX}\%$ of the inner clad region 106.

In some embodiments, the low-index trench region 112 may have a refractive index of less than −0.02% relative to pure silica. In some embodiments, the low-index trench region 112 may have a refractive index of less than −0.1% relative to pure silica. In some embodiments, the low-index trench region 112 may have a refractive index of less than −0.25% relative to pure silica. In some embodiments, the low-index trench region 112 may have a refractive index of less than −0.4% relative to pure silica. In some embodiments, the low-index trench region 112 may have a refractive index of less than −0.6% relative to pure silica. In some embodiments, the low-index trench region 112 may have a refractive index of less than −0.02% and greater than −1% relative to pure silica. In some embodiments, the low-index trench region 112 may have a refractive index of less than −0.2% and greater than −1% relative to pure silica. In some embodiments, the low-index trench region 112 may have a refractive index of less than −0.2% and greater than −0.6% relative to pure silica.

In some aspects, the low-index trench region 112 may have a fluorine concentration of greater than 0.1 weight %. In some embodiments, the low-index trench region 112 may have a fluorine concentration of greater than 0.4 weight %. In some embodiments, the low-index trench region 112 may have a fluorine concentration of greater than 0.8 weight %. In some embodiments, the low-index trench region 112 may have a fluorine concentration of greater than 1.4 weight %. In some embodiments the low index trench may have a fluorine concentration of greater than 2 weight %.

The inner barrier layer 116a surrounds and is direct contact with the low-index trench region 112. In the embodiments described herein, the inner barrier layer 116a prevents diffusion of down-dopant from the low-index trench region 112 to the overclad region 114 which surrounds the inner barrier layer 116a when the trench-overclad assembly 110 is being consolidated and doped, as will be described in more detail herein. In the embodiments described herein, the inner barrier layer 116a is formed from silica and generally has the same composition as the overclad region 114. Accordingly, in the relative refractive index profiles shown in FIGS. 1B and 1C, the relative refractive index of the inner barrier layer 116a is that of the overclad region 114 (i.e., as these regions exist in a consolidated state). In the embodiments described herein, the inner barrier layer 116a has an as-formed density (i.e., prior to consolidation of the trench-overclad assembly) of greater than or equal to 1.5 g/cm$^3$, more preferably greater than or equal to 1.75 g/cm$^3$ and, even more preferably, greater than 2 g/cm$^3$. In some preferred embodiments, the inner barrier layer 116a has an as-formed density ranging from about 1 g/cm$^3$ to about 1.5 g/cm$^3$. In some other embodiments, the inner barrier layer 116a has an as-formed density ranging from about 1.5 g/cm$^3$ to about 2.2 g/cm$^3$. The as-formed density of the inner barrier layer 116a is generally greater than the as-formed density of the low-index trench region 112 according to some implementations.

As shown in FIG. 1A, the inner barrier layer 116a generally extends from the radius $R_T$ to the radius $R_{ba}$ such that the inner barrier layer 116a has a radial thickness $T_{ib} = R_{ba} - R_T$. In the embodiments described herein, the radial thickness $T_{ib}$ of the barrier layer 116a is generally greater than about 10 μm, more preferably greater than about 50 μm, even more preferably greater than about 100 μm. In some embodiments, the radial thickness $T_{ib}$ of the inner barrier layer 116a is less than 100 μm. For example, the inner barrier layer 116a may be greater than or equal to about 10 μm and less than or equal to about 400 μm. In other embodiments, the inner barrier layer 116a may be greater than or equal to about 50 μm and less than or equal to about 400 μm. In still other embodiments, the inner barrier layer 116a may be greater than or equal to about 100 μm and less than or equal to about 400 μm. In additional embodiments, the inner barrier layer 116a can range from about 100 μm to about 700 μm. However, when the density of the inner barrier layer 116a exceeds 2.0 g/cm$^3$, the inner barrier layer 116a is effective for mitigating the diffusion of dopant irrespective of the thickness of the inner barrier layer 116a. Accordingly, in these embodiments, it should be understood that an inner barrier layer 116a of any thickness may be utilized.

Still referring to FIG. 1A, the overclad region 114 surrounds and is in direct contact with the inner barrier layer 116a. The overclad region 114 generally extends from the radius $R_{ba}$ to the radius $R_{OC}$ such that the overclad region 114 has a radial thickness $T_{OC} = R_{OC} - R_{ba}$. Further, in some embodiments (see, e.g., FIG. 1B), the overclad region 114 includes the inner barrier layer 116a and $T_{OC} = R_{OC} - R_T$. The overclad region 114 generally has a relative refractive index $\Delta_{OC}\%$ relative to pure silica glass which is greater than the relative refractive index $\Delta_{TMIN}\%$ of the low-index trench region 112 and less than the maximum relative refractive index $\Delta_{CMAX}\%$ of the core region 104. In some embodiments, $\Delta_{OC}\% \geq \Delta_{IC}\%$, as depicted in FIG. 1B. Accordingly, the overclad region 114 may comprise pure silica glass (SiO$_2$) (i.e., silica glass which is substantially free from any dopants) or silica-based glass with one or more dopants which increase the index of refraction (e.g., GeO$_2$, Al$_2$O$_3$, P$_2$O$_5$, TiO$_2$, ZrO$_2$, Nb$_2$O$_5$, Cl, and/or Ta$_2$O$_5$), such as when the overclad region 114 is "up-doped," so long as the relative refractive index $\Delta_{OC}\%$ of the overclad region 114 is less than the maximum relative refractive index $\Delta_{CMAX}\%$ of the core region 104 and greater than the minimum relative refractive index $\Delta_{TMIN}\%$ of the low-index trench region 112.

The outer barrier layer 116b surrounds and is direct contact with the overclad region 114. The outer barrier layer 116b can be considered to be part of or a sublayer within the overclad region 114. In the embodiments described herein, the outer barrier layer 116b prevents diffusion of downdopants that are introduced during processing of the low-index trench region 112 (e.g., before the low-index trench region 112 has been consolidated) from reaching the overclad region 114 via diffusion through the outer portions and surfaces of the trench-overclad assembly 110. In the embodiments described herein, the outer barrier layer 116b is formed from silica and generally has the same composition as the overclad region 114 and inner barrier layer 116a. Accordingly, in the relative refractive index profiles shown in FIGS. 1B and 1C, the relative refractive index of the outer barrier layer 116b is that of the overclad region 114. In the embodiments described herein, the outer barrier layer 116b has an as-formed density (i.e., prior to consolidation of the trench-overclad assembly) of greater than or equal to 1.5 g/cm$^3$, more preferably greater than or equal to 1.75 g/cm$^3$ and, even more preferably, greater than 2 g/cm$^3$. In some preferred embodiments, the outer barrier layer 116b has an as-formed density ranging from about 1 g/cm$^3$ to about 1.5 g/cm$^3$. In some other embodiments, the outer barrier layer 116b has an as-formed density ranging from about 1.5 g/cm$^3$ to about 2.2 g/cm$^3$.

As shown in FIG. 1A, the outer barrier layer 116b generally extends from the radius $R_{bb}$ to the radius $R_{OC}$ such that the outer barrier layer 116b has a radial thickness $T_{ob}=R_{OC}-R_{bb}$. In the embodiments described herein, the radial thickness $T_{ob}$ of the outer barrier layer 116b is generally greater than about 10 μm, more preferably greater than about 50 μm, even more preferably greater than about 100 μm. In some embodiments, the radial thickness $T_{ob}$ of the outer barrier layer 116b is less than 100 μm. For example, the outer barrier layer 116b may be greater than or equal to about 10 μm and less than or equal to about 700 μm. In other embodiments, the outer barrier layer 116b may be greater than or equal to about 50 μm and less than or equal to about 700 μm. In still other embodiments, the outer barrier layer 116b may be greater than or equal to about 100 μm and less than or equal to about 400 μm. In additional embodiments, the outer barrier layer 116b can range from about 500 μm to about 3000 μm. However, when the density of the outer barrier layer 116b exceeds 2.0 g/cm$^3$, the outer barrier layer 116b is effective for mitigating the diffusion of dopant irrespective of the thickness of the outer barrier layer 116b. Accordingly, in these embodiments, it should be understood that an outer barrier layer 116b of any thickness may be utilized.

Figure 2A:
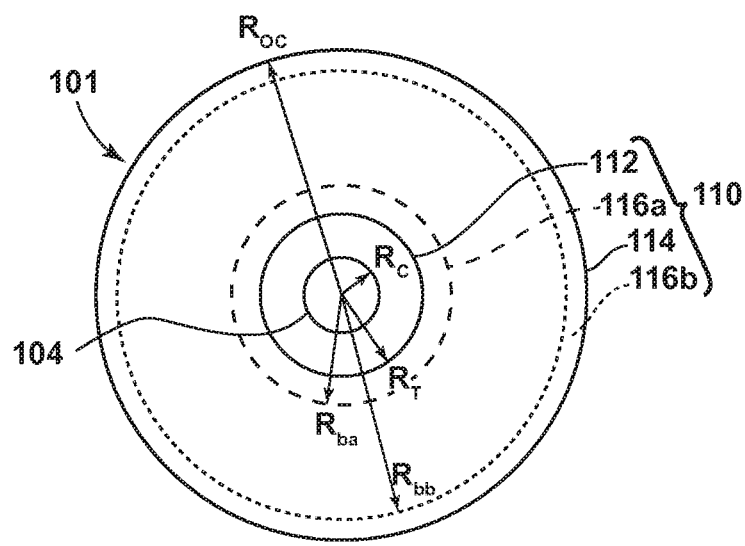
FIG. 2A schematically depicts a cross section of an optical fiber preform according to an alternative embodiment shown and described herein.
Figure 2B:
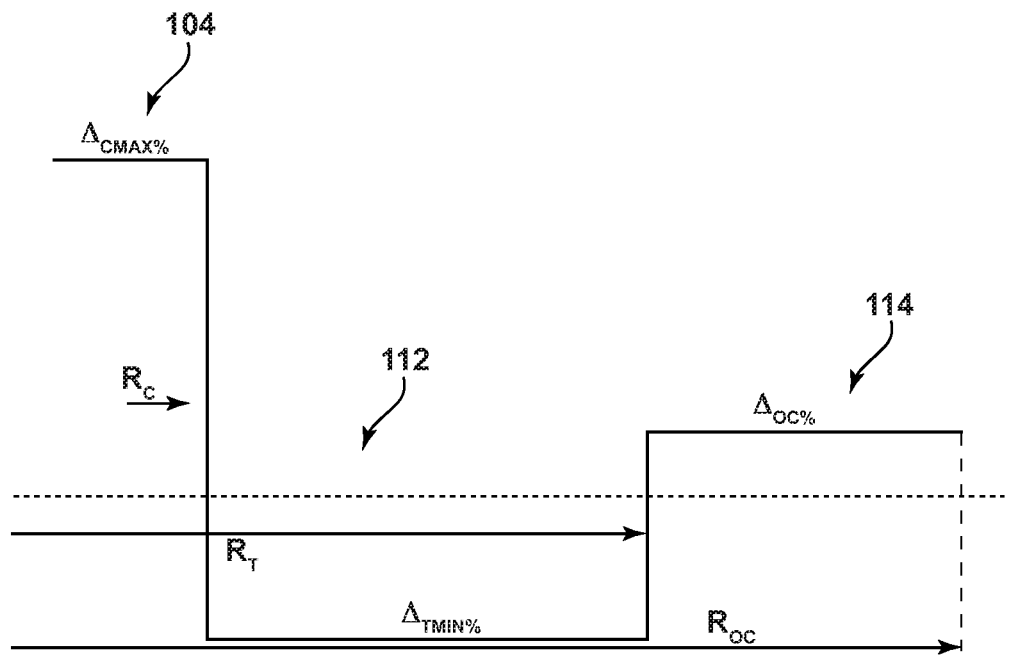
FIG. 2B schematically depicts a relative refractive index profile of the optical fiber preform of FIG. 2A according to one embodiment shown and described herein.

Referring now to FIG. 2A, another embodiment of an optical fiber preform 101 (e.g., in a state where preform 101 exists in a consolidated state) is schematically depicted. In this embodiment the core assembly is formed without an inner clad region (e.g., inner clad region 106 shown in FIG. 1A). Accordingly, in this embodiment, the core region 104 is in direct contact with the low-index trench region 112, as shown in FIG. 2A. The core region 104 may be formed with a step refractive index profile, as depicted in FIG. 2B or, alternatively, with a graded refractive index profile, as described above. In this embodiment, the low-index trench region 112, the inner barrier layer 116a, the outer cladding 114, and the outer barrier layer 116b may be as described hereinabove with respect to FIG. 1A.

Methods for forming the optical fiber preforms 100, 101 that are depicted in FIGS. 1A and 2A will now be described in more detail with respect to FIGS. 3A-3D and FIGS. 4-6. As noted hereinabove, the optical fiber preforms of the embodiments described herein are constructed from a core assembly and trench-overclad assembly which are separately formed and thereafter assembled to construct the optical fiber preform. In the embodiments described herein, each of the core assembly and the trench-overclad assembly are formed by depositing consecutive layers of silica-based soot on a bait rod using a vapor deposition process, such as the outside vapor deposition (OVD) process.

Figure 3A:
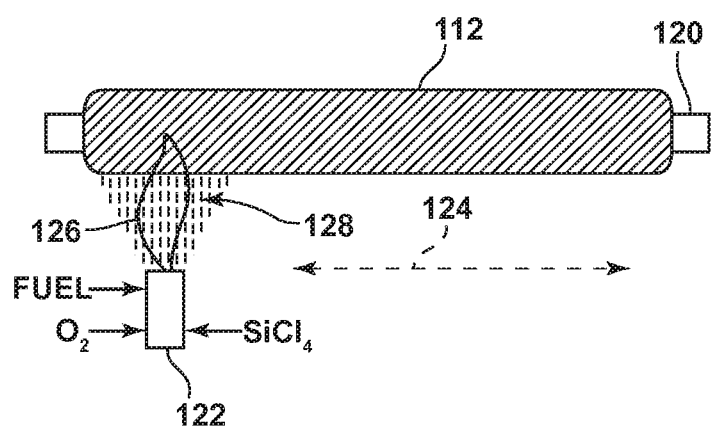
FIGS. 3A-3D schematically depict the formation of a trench-overclad structure of an optical fiber preform.

Referring to FIG. 3A by way of example, the low-index trench region 112 is formed by depositing silica-based soot on a bait rod 120. In some embodiments, the bait rod 120 is about 10 mm in diameter and has a composition that consists essentially of $Al_2O_3$ or another suitable refractory material. The silica-based soot is formed by providing a vapor phase silica glass precursor material, such as $SiCl_4$ or octamethylcyclotetrasiloxane (OMCTS), to a burner 122. The gas-fed burner 122 is supplied with fuel, such as $CH_4$, $D_2$ (deuterium), $CD_4$ or CO, and oxygen which are combusted to create flame 126. In some embodiments, the vapor phase silica precursor material is $SiCl_4$ and the gas-fed burner 122 is supplied with a fuel such as $D_2$, $CD_4$ or CO in order to limit the amount of residual OH in the deposited silica-based soot. Where such a combination is used to form the silica glass of the barrier layer, the interaction between the mode and any residual water in the barrier layer is mitigated. The vapor phase silica precursor material may be delivered to the burner at a flow rate from about 4 L/min to about 10 L/min while the fuel may be supplied to the burner at a flow rate from about 10 L/min to about 40 L/min.

The vapor phase silica precursor material is reacted in the flame 126 to produce silica-based soot 128 which is deposited on the bait rod 120 as the bait rod is rotated at a rate from about 150 rpm to about 400 rpm. In the embodiments described herein, the vapor phase silica precursor material used to form the trench region 112 is substantially free from dopants and, as a result, the silica-based soot 128 deposited on the bait rod 120 is substantially free from dopants as it is deposited on the bait rod 120 to form the low-index trench region 112 (i.e., region 112 as it exists before consolidation). The flame 126 of the gas-fed burner 122 is traversed at a first speed back and forth over the axial length of the bait rod 120 as indicated by arrow 124 as the bait rod is rotated thereby building up silica-based soot on the bait rod 120 and forming the low-index trench region 112. In the embodiments described herein, the traverse rate of the flame 126 is greater than 2 cm/s, preferably greater than or equal to 3 cm/s.

In the embodiments described herein, the silica-based soot is deposited on the bait rod 120 such that the low-index trench region 112 has a first density which is less than 0.8 g/cm$^3$ and, in some embodiments, less than 0.5 g/cm$^3$. As noted hereinabove, the silica-based soot 128 deposited to form the low-index trench region 112 is substantially free from any dopants which could alter the index of refraction of the silica in the region 112 (i.e., as measured after consolidation). Accordingly, it should be understood that the low-index trench region 112, as formed, is at least initially substantially free from dopants.

Figure 3B:
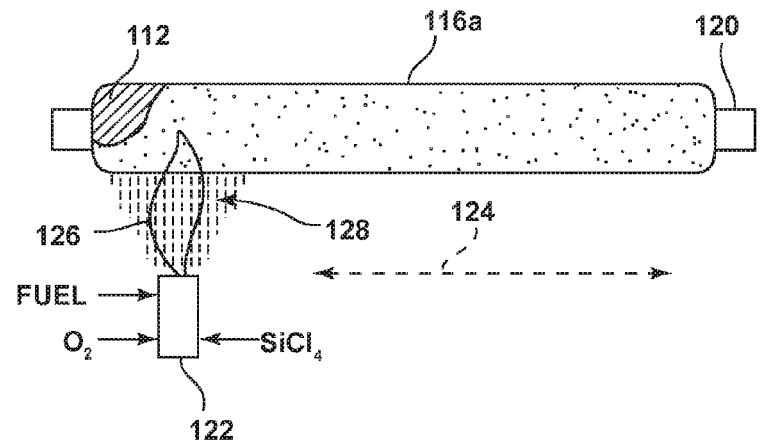

Referring to FIG. 3B, the inner barrier layer 116a is formed around the low-index trench region 112. The inner barrier layer 116a generally has a second density which is greater than the first density of the low-index trench region 112. As described above, the density of the inner barrier layer 116a is greater than or equal to 1.5 g/cm$^3$, more preferably greater than or equal to 1.75 g/cm$^3$ and, even more preferably, greater than 2 g/cm$^3$ immediately following the formation of the inner barrier layer 116a. Further, in some preferred embodiments, and as noted earlier, the inner barrier layer 116a has an as-formed density ranging from about 1 g/cm$^3$ to about 1.5 g/cm$^3$. In some other embodiments, the inner barrier layer 116a has an as-formed density ranging from about 1.5 g/cm$^3$ to about 2.2 g/cm$^3$. In one embodiment, the inner barrier layer 116a is formed around the low index trench region 112 by increasing a temperature of the flame 126 of the gas-fed burner 122 from the first temperature to a second temperature and decreasing the traverse speed of the flame of the burner from the first speed to a second speed. The temperature of the flame 126 can be increased by increasing the flow rate of the fuel and oxygen supplied to the gas-fed burner 122. In one embodiment, the temperature of the flame 126 of the gas-fed burner 122 is increased from the range of 1500° C.-2000° C. to greater than 2000° C. The traverse speed of the flame of the burner may be decreased from the first speed used to deposit the low-index trench region 112 to a second speed which is preferably less than 1 cm/sec, more preferably less than 0.5 cm/sec and, even more preferably, less than 0.25 cm/sec. Increasing the temperature of the flame 126 of the gas-fed burner 122 and decreasing the traverse speed of the flame increases the density of the soot deposited on the bait rod thereby forming a barrier layer 116 around the low-index trench region 112 which has decreased permeability.

In another embodiment, the inner barrier layer 116a is formed around the low-index trench region 112 by increasing a temperature of the flame 126 of the gas-fed burner 122 from a first temperature to a second temperature and reducing a concentration of the vapor phase silica-based glass precursor materials supplied to the gas-fed burner 122. For example, the flow of silica-based glass precursor materials may be decreased from approximately 4-10 L/min during the deposition of the low-index trench region 112 to less than 1 L/min during formation of the inner barrier layer 116a. In one embodiment, the concentration of vapor phase silica-based glass precursor materials is decreased to zero. Reducing the concentration of the silica-based glass precursor material increases the flame temperature and slows or even halts (e.g., when the flow of silica-based glass precursor materials is zero) the deposition of silica-based glass soot over the low-index trench region 112. However, increasing the temperature of the flame 126 causes densification of the outer layer of silica-based soot of the low-index trench region 112 such that the outer layer of silica-based soot has a density which is greater than the density of the silica-based soot in the remainder of the thickness of the low-index trench region 112. This densified layer of soot forms the inner barrier layer 116a. In this embodiment, the temperature of the flame 126 may be increased to 2000° C. or greater in order to densify the outer layer of silica-based soot of the low-index trench region 112.

In yet another embodiment, the inner barrier layer 116a may be formed around the low-index trench region 112 by increasing a temperature of the flame 126 of the gas-fed burner 122 from a first temperature to a second temperature and decreasing the traverse speed of the burner from a first speed to a second speed, as described above, while reducing a concentration of the vapor phase silica-based precursor materials in the carrier gas supplied to the gas-fed burner 122. As described above, reducing the concentration of the silica-based precursor material slows or halts the deposition of silica-based soot onto the low-index trench region 112, as described above. However, increasing the temperature of the flame 126 and decreasing the traverse speed of the flame 126 densifies the outer layer of silica-based soot of the low-index trench region 112 such that the outer layer of silica-based soot has a density which is greater than the density of the silica-based soot in the remainder of the low-index trench region 112. This densified layer of soot forms the inner barrier layer 116a. In this embodiment, the temperature of the flame 126 may be increased to 2000° C. or greater in order to densify the outer layer of silica-based soot of the low-index trench region 112. In this embodiment, the traverse speed of the flame 126 is decreased from the first speed used to deposit the low-index trench region 112 to a second speed which is preferably less than 1 cm/sec, more preferably less than 0.5 cm/sec and, even more preferably, less than 0.25 cm/sec.

While in some embodiments described herein the inner barrier layer 116a is formed by heating deposited silica-based soot with a gas-fed burner to densify the soot, it should be understood that, in other embodiments, other heat sources may be used. For example, in an alternative embodiment, a $CO_2$ laser may be utilized to heat the outer layer of silica-based soot of the low-index trench region and thereby densify the soot. In an alternative embodiment, a plasma torch or burner (where thermal plasmas are generated by, for example, direct current, alternating current and/or radio-frequency, etc.) may be utilized to heat the outer layer of silica-based soot of the low-index trench region to densify it.

Moreover, in some embodiments described herein, it is contemplated that the rate of rotation of the bait rod may be adjusted during formation of the inner barrier layer 116a in order to achieve a barrier layer having the desired density. Specifically, decreasing the rate of rotation of the bait rod may assist in increasing the density of the inner barrier layer 116a.

Figure 3C:
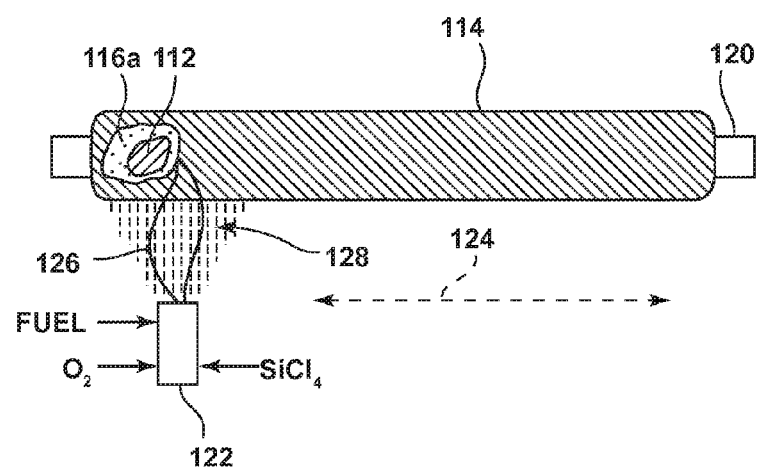

Referring now to FIG. 3C, after the inner barrier layer 116a is formed around the low-index trench region 112, the overclad region 114 is formed around the inner barrier layer 116a. In the embodiments described herein, the overclad region 114 may be formed in a similar manner as the low-index trench region 112, including at roughly equivalent as-formed densities. Specifically, vapor phase silica-based glass precursor material, such as $SiCl_4$ or OMCTS, is supplied to the gas-fed burner 122 and reacted in the flame 126 to form silica-based soot which is deposited on the bait rod 120 around the inner barrier layer 116a as the bait rod is rotated. The flame 126 of the gas-fed burner 122 is traversed at the first speed back and forth over the axial length of the bait rod 120 as indicated by arrow 124 as the bait rod is rotated, as described above, thereby building up silica-based soot on the bait rod 120 and forming the overclad region 114. The silica-based soot used to form the overclad region 114 may be pure silica-based soot (i.e., silica-based soot which is substantially free from dopants) or silica-based soot comprising one or more dopants for increasing the index of refraction of the overclad region 114.

Figure 3D:
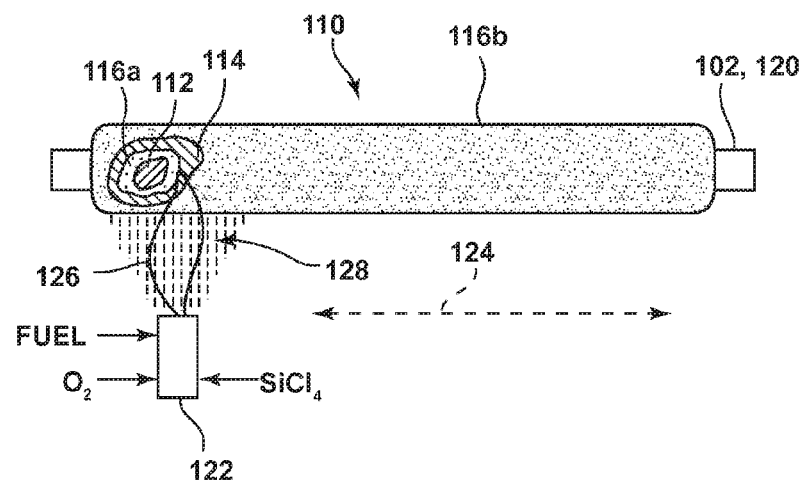

Referring now to FIG. 3D, the bait rod 120 can be removed from the as-formed inner barrier layer 116a, overclad region 114 and low-index trench region 112. A core assembly 102 can then be inserted into the center hole or channel of the regions 112, 114, 116a. The core assembly 102, low-index trench region 112, overclad region 114 and inner barrier layer 116a can then be consolidated to closed-porosity and/or void-free glass, allowing the centerline of the as-formed trench-overclad assembly 100 to collapse onto the core assembly 102 to form the trench-overclad assembly 110 of the optical fiber preform 100. During the consolidation process, the core assembly 102 and trench-overclad assembly 110 can be dehydrated by flowing the dehydration gas (e.g., chlorine gas) through the centerline of these assemblies and along the outer muffle. As part of this process, an outer barrier layer 116b can be formed within and/or to surround the overclad region 114. As depicted in FIG. 3D, the outer barrier layer 116b can also be formed using the methods (e.g., the fire-polishing methods) outlined earlier and shown schematically in FIG. 3B to prepare the inner barrier layer 116a. According to some embodiments, the outer barrier layer 116b can be formed using any of the other methods described earlier in connection with the formation of the inner barrier layer 116a.

As also noted earlier, the outer barrier layer 116b can be prepared with an as-formed density (i.e., prior to consolidation) of greater than or equal to 1.5 g/cm$^3$, more preferably greater than or equal to 1.75 g/cm$^3$ and, even more preferably, greater than 2 g/cm$^3$. In some preferred embodiments, the outer barrier layer 116b has an as-formed density ranging from about 1 g/cm$^3$ to about 1.5 g/cm$^3$. In some other embodiments, the outer barrier layer 116b has an as-formed density ranging from about 1.5 g/cm$^3$ to about 2.2 g/cm$^3$. The as-formed density of the outer barrier layer 116b is generally greater than the as-formed density of the overclad region 114 according to some implementations.

In the embodiments of the methods described herein, the radial thickness $T_{ob}$, of the as-formed outer barrier layer 116b is generally greater than about 10 μm, more preferably greater than about 50 μm, even more preferably greater than about 100 μm. In some embodiments, the radial thickness $T_{ob}$, of the outer barrier layer 116b is less than 100 μm. For example, the outer barrier layer 116b may be greater than or equal to about 10 μm and less than or equal to about 400 μm. In other embodiments, the outer barrier layer 116b may be formed to be greater than or equal to about 50 μm and less than or equal to about 400 μm. In still other embodiments, the outer barrier layer 116b may be greater than or equal to about 100 μm and less than or equal to about 400 μm. In additional embodiments, the outer barrier layer 116b can be formed in a range from about 500 μm to about 3000 μm.

According to one implementation, the outer barrier layer 116b can be formed by a glazing process that results in a closed porosity layer on the surface of the overclad region 114. The glazing process to create the outer barrier layer 116b can include, for example, traversing the trench-overclad assembly 110 (and the core assembly 102 inserted into the trench-overclad assembly 110) downward through the hot zone (e.g., at about 1450 to 1550° C.) of the furnace (e.g., at a temperature ramp rate of about 25° C./min) for about 30-60 minutes and then upward (e.g., at a cooling rate of 100° C./min) to about 900° C. multiple times, until the desired portion of the overclad region 114 is densified into an outer barrier layer 116b of the requisite density. The use of multiple traverse passes of the trench-overclad assembly 110 at relatively fast traverse speeds allows for the densification of the outside of the overclad region 114, without propagating a sintering front to a significant and detrimental depth within the preform 100. During the consolidation process, the core assembly 102 and trench-overclad assembly 110 can be dehydrated by flowing the dehydration gas (e.g., chlorine gas) through the centerline of these assemblies and along the outer muffle.

As also depicted in FIG. 3D, the bait rod 120 can be left in place during formation of the outer barrier layer 116b. In these implementations, the outer barrier layer 116b is formed using any of the processes outlined earlier before any consolidation steps. After the outer barrier layer 116b has been formed, the bait rod 102 is removed and the core assembly 102 is inserted into the center hole or channel of the regions 112, 114, 116a and 116b. The core assembly 102, low-index trench region 112, overclad region 114, inner barrier layer 116a and outer barrier layer 116b can then be consolidated to glass, allowing the centerline of the as-formed trench-overclad assembly 100 to collapse onto the core assembly 102 to form the trench-overclad assembly 110 of the optical fiber preform 100.

The core assembly (e.g., core assembly 102) with or without an inner cladding (e.g., inner cladding 106) is separately constructed in a similar manner as the trench-overclad assembly. Specifically, a silica-based soot blank corresponding to the core region 104 of the preform is deposited on a bait rod utilizing an outside vapor deposition (OVD) process as described above, generally in a single laydown step. Alternatively, a vapor axial deposition (VAD) process can be employed to create the core region 104 of the core assembly 102. In some implementations, the diameter of the core region 104 is about 40 mm to 60 mm and the length of the core assembly 102 is about 100 cm.

The silica-based soot from which the core region 104 is formed may be doped with a dopant which increases the index of refraction of the core region relative to pure silica glass (i.e., silica glass which is substantially free of dopants) or, alternatively, may comprise pure silica glass. The vapor phase silica-based glass precursor materials used to form the core region 104 are provided to the burner along with a vapor phase dopant to achieve the desired up-doping of the core region. In embodiments where the core assembly 102 further comprises an inner clad region 106, the inner clad region may be formed on the bait rod around the core region 104 utilizing similar depositions techniques. As noted above, the inner clad region may be formed from pure silica-based glass or silica-based glass doped with an up-dopant or a down-dopant so long as the relative refractive index of the inner clad region is less than the relative refractive index of the core region.

In some embodiments, the density of the core region 104 is targeted to be greater than about 0.8 g/cm$^3$, or more preferably greater than about 1 g/cm$^3$, to mitigation migration of down-dopants (e.g., fluorine) throughout the core assembly 102. Most preferably, the core region 104 is processed with an as-formed density between about 1 and 1.6 g/cm$^3$, particularly to minimize down-dopant migration. In general, the core assembly 102 is processed to have a weight in the range of 2000-5000 grams using the OVD/VAD processes.

Once the core assembly 102 has been formed on the bait rod, the bait rod is removed from the core assembly and the core assembly 102 is consolidated into solid glass. Specifically, the core assembly 102 is first dried in a flowing dehydration gas, such as chlorine. Thereafter, the core assembly is heated to about 1450° C. to 1550° C. for a sufficient period of time (e.g., about 3 hours) to sinter the core assembly into solid glass. The sintered core assembly 102 may be redrawn into core canes of smaller diameter for further processing before integration with trench-overclad assemblies (e.g., trench-overclad structure 100).

Referring now to FIG. 4, after the low-index trench region 112, the inner barrier layer 116a, the overclad region 114 and outer barrier layer 116b have been deposited or otherwise formed on the bait rod 120 thereby forming the trench-overclad assembly 110 of the optical fiber preform, the bait rod 120 is removed from the trench-overclad assembly 110 leaving a central channel 118 which extends through the trench-overclad assembly 110. As also described earlier, some implementations of the method have the bait rod 120 removed before the formation of the inner barrier layer 116b. In either of the approaches, the consolidated core assembly 102 is inserted into the central channel of the trench-overclad assembly 110. When the consolidated core assembly 102 is positioned in the central channel left by the removal of the bait rod 120 there is a slight gap between the consolidated core assembly 102 and the low-index trench region 112 as the trench-overclad assembly has not yet been fully consolidated to fully dense glass.

The trench-overclad assembly 110 and consolidated core assembly 102 are then placed in a consolidation furnace 130 where the trench-overclad assembly is consolidated to a solid glass, thus adhering the trench-overclad assembly 110 to the core assembly 102. During consolidation, the trench-overclad assembly 110 is first dried by flowing a dehydration gas between the consolidated core assembly and the trench-overclad assembly 110 (i.e., through the central channel 118) and around the exterior surfaces of the trench-overclad assembly 110. In one embodiment, the dehydration gas comprises a mixture of 2% to 6% chlorine gas in helium gas. The mixture is directed through and around the trench-overclad assembly at a flow rate of about 5 L/min to about 20 L/min as the trench-overclad assembly 110 is heated to a temperature from about 800° C. to about 1250° C. for a period of 0.5 to 4 hours. The flow of chlorine gas both through and around the trench-overclad assembly 110 facilitates drying both the low-index trench region 112 and the overclad region 114 in a single step.

Thereafter, as depicted in FIG. 4, the low-index trench region 112 is doped by directing a flowing, precursor gas 132 comprising a dopant, such as fluorine, through the trench-overclad assembly 110 in the central channel 118 as both the trench-overclad and core assemblies 110 and 102, respectively, are heated to a temperature from about 1400° C. to about 1500° C. In one embodiment, the precursor gas includes a mixture of a dopant, such as $SiF_4$ or $CF_4$, and a balance of He gas. In this embodiment, the mixture may include 25% dopant and 75% helium gas. The precursor gas is directed through the trench-overclad assembly 110 at a flow rate from about 0.1 L/min to about 1.0 L/min. The precursor gas diffuses into the low-index trench region 112 thereby doping the low-index trench region 112 with fluorine. However, the increased density of the inner barrier layer 116a and the outer barrier layer 116b prevents the precursor gas from diffusing into the overclad region 114. As a result, contamination of the overclad region 114 with the precursor gas 132 is prevented. Moreover, because the core assembly 102 is fully consolidated, the precursor gas 132 does not diffuse into the core assembly 102 thereby preventing contamination of the core assembly 102.

In some embodiments, an inert muffle gas 134, such as helium, nitrogen or argon, is introduced into the consolidation furnace in addition to the precursor gas 132 and directed through the trench-overclad assembly 110 as shown in FIG. 4. The muffle gas 134 is directed around the exterior surface of the trench-overclad assembly 110 at a flow rate from about 2 L/min to about 50 L/min (e.g., a flow rate of 5 L/min is acceptable in some aspects) thereby diluting the precursor gas 132 which exits the central channel 118 and inhibiting the precursor gas 132 from diffusing into the overclad region 114 from the outside of the trench-overclad assembly 110. In addition, the outer barrier layer 116b also prevents or otherwise inhibits the dopants from the precursor gas 132 from diffusing into the overclad region 114.

Thereafter, the trench-overclad assembly 110 is sintered into solid glass by down-driving the trench-overclad assembly 110 and the core assembly 102 through a hot zone of the consolidation furnace 130 (see FIG. 4) at a rate of about 5 mm/min to 50 mm/min. The hot zone generally has a temperature from about 1400° C. to about 1500° C. Following the down-drive step, the trench-overclad assembly 110 and the core assembly 102 are a single, solid glass optical fiber preform 100 (see FIG. 5).

Referring to FIG. 4A, the low-index trench region 112 can also be doped and consolidated without the presence of the core assembly 102 within the channel 118. In these implementations, the core assembly 102 is fully consolidated separately from the trench-overclad assembly 110. Once the doping process is completed to form the low-index trench region 112, the fully-consolidated core assembly 102 can be inserted into the consolidated trench-overclad assembly 110. Together, these assemblies can be redrawn into a combination blank and then further into an optical fiber preform (e.g., optical fiber preform 100 as shown in FIG. 5). In certain embodiments, the trench-overload assembly 110 is fully consolidated without the presence of a core assembly, such as core assembly 102. As such, the assembly 110 is formed as an optical preform product that exists in a tube-like configuration. This preform, for example, can then be further processed into an optical fiber preform using a rod-in-tube process as understood by those within ordinary skill in the field.

Figure 6:
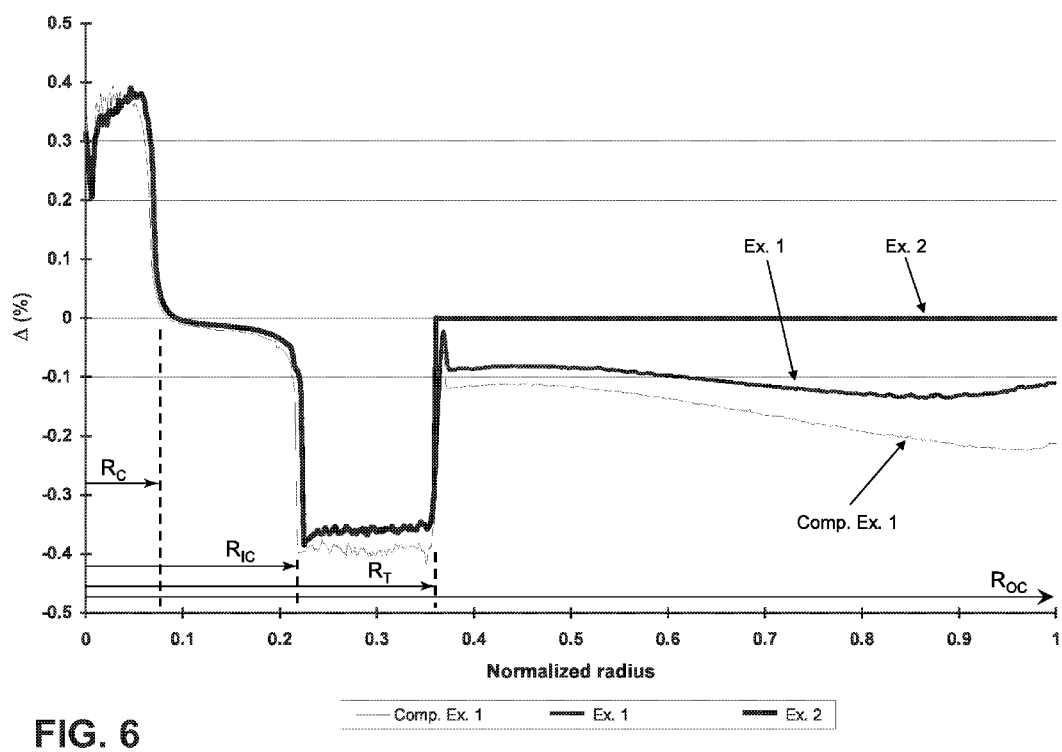
FIG. 6 depicts the refractive index profiles of the low index trench region and the overclad region of an optical fiber preform with an inner barrier and with and without an outer barrier layer formed in accordance with the methods described herein.

Referring now to FIG. 6, the "Comp. Ex. 1" plot is a comparative example that provides an exemplary relative refractive index profile of the trench-overclad assembly 110 of an optical fiber preform 100 (e.g., as configured in FIG. 1A), but without an outer barrier layer 116b. In particular, "Comp. Ex. 1" shows the relative refractive index of the low-index trench region 112 and the relative refractive index of the overclad region 114 as a function of the radial thickness of the trench-overclad assembly for the comparative example. As shown in FIG. 6, the inner barrier layer 116a of the "Comp. Ex. 1" comparative example has prevented the precursor gas containing the down-dopant from diffusing from the low-index trench region 112 into the overclad region 114. However, because Comp. Ex. 1 has no outer barrier layer, precursor dopant gas 132 entering the furnace atmosphere 134 can dope (e.g., form F-doped silica) and, as a result, the relative refractive index of the overclad region is substantially lowered throughout the radial thickness of the overclad region.

Referring again to FIG. 6, "Ex. 1" and "Ex. 2" reflect inventive examples 1 and 2, which are exemplary relative refractive index profiles of the trench-overclad assembly 110 of optical fiber preforms 100 (e.g., as configured in FIG. 1A) that include an outer barrier layer 116b. In particular, "Ex. 1" and "Ex. 2" show the relative refractive index of the low-index trench region 112 and the relative refractive index of the overclad region 114 as a function of the radial thickness of the trench-overclad assembly for the inventive examples 1 and 2. As shown in FIG. 6, the inner barrier layer 116a and outer barrier layer 116b of the "Ex. 1" and "Ex. 2" fiber preforms worked together to prevent the precursor gas containing the down-dopant from diffusing from the low-index trench region 112 into the overclad region 114 and from outside the preform 100 into the overclad region during processing of the preform. As a result, the relative refractive index of the overclad region 114 is substantially uniform throughout the radial thickness of the overclad region in these inventive examples.

The Comp. Ex. 1, Ex. 1 and Ex. 2 profiles depicted in FIG. 6 correspond to the profiles of an optical fiber preform with an inner barrier layer, and optical fiber preforms with inner and outer barrier layers, respectively. With regard to the Comp. Ex. 1 profile, the inner portion of the overclad region at a radial location of approximately $R_T$ exhibits a relative refractive index of −0.05%, which then drops to about −0.16% at increasing radial distances throughout the overclad region. The slight drop in relative refractive index in the overclad region (from $R_T$ and, alternatively, below a relative refractive index of 0.0%) in the Comp. Ex. 1 profile is likely attributable to some remnant amount of down-dopant (i.e., fluorine) that has diffused into the overclad region during the processing of the low-index trench region and subsequent high-temperature processing. A significant percentage of the remnant down-dopant in the overclad region in the Comp. Ex. 1 profile is likely attributed to diffusion of the down-dopant through the outermost portion of the trench-overclad assembly via precursor gas along the outside of the consolidation furnace 130 (see FIG. 4).

In contrast to the Comp. Ex. 1, the Ex. 1 profile, which is indicative of an optical fiber preform having both an inner and an outer barrier layer, exhibits a lower "drop" in relative refractive index in the overclad region. At $R_T$, the relative refractive index of the Ex. 1 profile is slightly lower than 0.0%. At increasing radial locations within the overclad region, the relative refractive index drops only slightly from about −0.08% to about −0.12%. Hence, the drop in relative refractive index in the overclad region of the Ex. 1 profile from 0.0% is significantly less than the drop observed in the overclad region of the Ex. 1 profile in its overclad region. Consequently, the outer barrier layer present in the optical fiber preform employed to generate the Ex. 1 profile serves to significantly decrease detrimental down-dopant diffusion within the overclad region.

Also in contrast to the Comp. Ex. 1, the Ex. 2 profile, which is indicative of an optical fiber preform having both an inner and an outer barrier layer, exhibits essentially no "drop" in relative refractive index in the overclad region. Consequently, the outer barrier layer present in the optical fiber preform employed to generate the Ex. 2 profile serves to significantly decrease detrimental down-dopant diffusion within the overclad region.

The preforms constructed as described herein may be drawn into optical fibers which have relative refractive index profiles similar to those shown in FIG. 1B, 1C or 2B.

EXAMPLES

The invention will be further clarified by the following examples.

Example 1

A trench-overclad assembly with a barrier layer was made with an outside vapor deposition (OVD) process in the form of a 1 m long 2000 g silica soot preform. The low-index trench region of the trench-overclad assembly was formed by depositing about 200 g of substantially pure silica-based soot onto a rotating alumina bait rod having an outer diameter of 10 mm in a lathe. The silica-based soot was formed via a hydrolysis endothermic reaction of a vapor phase silica-based glass precursor material in a flame of a gas fed burner. The silica-based glass precursor material was $SiCl_4$ supplied to the burner. The flame was created by a mixture of $CH_4$ and $O_2$, each of which were supplied to the burner. The reaction of the $SiCl_4$ in the flame of the burner progressed according to the equation:

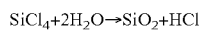

$SiCl_4 + 2H_2O \rightarrow SiO_2 + HCl$

As the silica-based glass soot was generated in the flame, the flame of the burner was traversed over the bait rod at a rate greater than about 2 cm/s while the bait rod was rotated at a rate of approximately 150 rpm to about 400 rpm thereby causing the soot to be deposited around the bait rod. The silica-based glass soot produced by this reaction was deposited on the bait rod such that the low-index trench region had a density of about 0.4 to 0.5 g/cm³.

Thereafter, an inner barrier layer was formed over the low-index trench region by decreasing the flow of the $SiCl_4$ into the burner to zero, thereby reducing or eliminating deposition of $SiO_2$ soot and increasing the temperature of the flame. The flame fire-polished the soot preform for 10 passes and densified the outer-most layer of soot of the trench region to form an inner barrier layer with a density from about 2 to 2.2 g/cm³ and a thickness of about 0.1 to 0.7 mm.

Subsequently, the overclad region was then deposited over the barrier layer. Specifically, the flow of vapor phase $SiCl_4$ to the burner was restored such that about 2000 g of silica-based soot (having a density of about 0.4 to 0.5 g/cm³) was deposited on the inner barrier layer to form the overclad region of the trench-overclad assembly.

The alumina bait rod was then removed from the trench-overclad assembly and an 8.5 mm diameter glass core cane assembly was inserted in the central channel left by the alumina bait rod. The core cane assembly consisted of a 7.5 wt. % $GeO_2$-doped $SiO_2$ core and a $SiO_2$ inner cladding with a core/clad ratio of about 0.4. The core cane assembly was separately formed by an OVD process such that the core cane assembly had the desired refractive index profile. The trench-overclad assembly with the inserted core cane assembly was then loaded into a consolidation furnace for consolidation, including drying at 900° C. in an atmosphere comprising about 3 vol. % $Cl_2$ gas and a balance of He gas flowing both around the outside of the preform and through the $SiO_2$ handle and, thus, the annulus between the core cane and the soot preform.

The assembly was then traversed (down-driven) through a hot zone having a peak temperature of about 1500° C. at a temperature ramp rate of about 25° C./min, then up-driven through the hot zone and cooled at 100° C./min back to about 900° C. This down- and up-driving procedure was then repeated two more times, resulting in an approximately 1 mm thick outer barrier layer having a density of about 1.7 g/cm³, configured to prevent or limit doping of the preform between the inner and outer barrier layers in the overclad region.

Thereafter, the assembly was cooled to about 900° C. and a low-index trench region was F-sinter doped by flowing a mixture of 10 vol. % $SiF_4$ and a balance of He gas through the $SiO_2$ handle, and thus the central channel (i.e., between the core assembly and the low-index trench region) to fluorine dope the silica soot between the core cane and the inner barrier layer at a flow rate of 1.1 L/min, and flowing He gas at a flow rate of 5 L/min through the bottom of the consolidation furnace. The trench-overclad assembly was then consolidated while being exposed to these gases and flow rates by down-driving the trench-overclad assembly into a sintering zone of the consolidation furnace having a peak temperature of 1500° C. at a temperature ramp rate of 5° C./min to fluorine dope the inner annulus $SiO_2$ soot and collapse the $SiO_2$ soot onto the core cane. In particular, a fully-densified optical fiber preform was thus prepared having a $GeO_2$-doped $SiO_2$ core, $SiO_2$ inner clad, fluorine-doped $SiO_2$ low-index trench region and a $SiO_2$ overclad region. Further, the trench-overclad assembly prepared in this fashion had a relative refractive index profile as shown in FIG. 6 (i.e., as reflected in the "Ex. 1" profile).

Example 2

The optical fiber preform for Ex. 2 was modeled. In particular, the Ex 2 optical fiber preform was made in an identical manner as described for Ex. 1 except the assembly was then traversed using the down- and up-driving procedure through the hot zone for a total of four times, resulting in an approximately 1 mm thick outer barrier layer having a density of about 2.1 g/cm$^3$, configured to prevent or limit doping of the preform between the inner and outer barrier layers in the overclad region. The preform was then fluorine doped, and sintered in the process described in Ex. 1. The trench-overclad assembly prepared in this fashion had a relative refractive index profile as shown in FIG. 6 (i.e., as reflected in the "Ex. 2" profile).

Comparative Example 1

A similar process was used to manufacture an optical fiber assembly for the comparative example as described in Example 1, except an outer barrier layer was not used. That is, silica soot was deposited on a bait rod to form a trench region, formation of a barrier layer was effected with the burner, additional silica soot was deposited to form the overclad, the bait rod was removed, and a core cane assembly was inserted into the centerline annulus (e.g., central channel). Next, this assembly was placed into a consolidation furnace, a chlorine drying step was applied to the preform assembly, and then the same quantities of SiF$_4$ plus helium were flowed through the centerline annulus, and helium was flowed through the bottom of the consolidation furnace. These gases were directed while down-driving the preform assembly through a hot zone in order to dope the inner annulus with fluorine and sinter the preform. In particular, a fully-densified optical fiber preform was thus prepared having a GeO$_2$-doped SiO$_2$ core, SiO$_2$ inner clad, fluorine-doped SiO$_2$ low-index trench region and a partially F-doped SiO$_2$ overclad region. Further, the trench-overclad assembly prepared in this fashion has a relative refractive index profile as shown in FIG. 6 (i.e., the Comp. Ex. 1 profile).

Based on the foregoing, it should now be understood that the methods described herein can be utilized to form an optical fiber preform with a low-index trench region surrounding the core in a reduced number of steps. Specifically, forming a separate trench-overclad assembly with a dense barrier layer positioned between the low-index trench region and the overclad region permits the low-index trench region and the overclad region to be formed as one assembly and the low-index trench region to be down-doped without contaminating the overclad region with the down-dopant. This construct also allows the low-index trench region and the overclad region to be dried in a single step thereby eliminating water contamination in both regions. Accordingly, it should be understood that incorporation of the barrier layer in the trench-overclad assembly eliminates the need to separately form and consolidate the low-index-trench region and the overclad region.

What is claimed is:

1. A method for forming an optical fiber preform, comprising:

depositing silica-based soot on a bait rod to form a low-index trench region, wherein the silica-based soot is deposited such that the trench region has a first density;
forming an inner barrier layer comprising silica around the trench region, wherein the inner barrier layer has a second density greater than the first density;
depositing silica-based soot around the first barrier layer to form an overclad region of the optical fiber preform at a third density, wherein the second density is greater than the third density;
removing the bait rod from a central channel of a trench-overclad structure that comprises the trench region, the inner barrier layer and the overclad region;
inserting a core cane into the central channel of the trench-overclad structure after the step for removing the bait rod;
flowing a down dopant-containing gas through the central channel of the trench-overclad structure after the step for inserting the core cane, wherein the trench-overclad structure is sufficiently heated to dope the trench region with the down dopant, and further wherein the inner barrier layer mitigates diffusion of the down dopant into the overclad region;
forming an outer barrier layer comprising silica in an outer portion of the overclad region prior to the step of flowing the down dopant-containing gas through the central channel, wherein the outer barrier layer has a fourth density greater than the third density and mitigates diffusion of the down dopant from the down dopant-containing gas into the overclad region during the step of flowing the down dopant-containing gas; and
consolidating the trench-overclad structure and the core cane after the step for inserting the core cane into the optical fiber preform,
wherein the step of forming the outer barrier layer is conducted by traversing the trench-overclad structure into and out of a furnace hot zone, and
further wherein the outer barrier layer comprises closed porosity and a thickness that ranges from 500 microns to about 3000 microns.

2. The method of claim 1, wherein the steps for removing the bait rod and inserting the core cane are conducted before the step for forming an outer barrier layer.

3. The method of claim 1, wherein the steps for removing the bait rod and inserting the core cane are conducted after the step for forming an outer barrier layer.

4. The method of claim 1, wherein the down dopant is fluorine the down dopant-containing gas comprises one or both of CF$_4$ and SiF$_4$.

5. The method of claim 1, further comprising:
drawing single-mode or multi-mode optical fiber from the optical fiber preform.

6. The method of claim 1, wherein the second density of the inner barrier layer and the fourth density of the outer barrier layer are greater than about 1.5 g/cm$^3$.

7. The method of claim 1, wherein the second density of the inner barrier layer and the fourth density of the outer barrier layer are greater than about 1.75 g/cm$^3$.

8. The method of claim 1, wherein the inner barrier layer has a thickness that ranges from about 10 to 700 microns.

9. The method of claim 1, wherein the steps of flowing a down dopant-containing gas, forming an outer barrier layer and consolidating the trench-overclad structure are conducted sequentially in a furnace without removal of the trench-overclad structure from the furnace until after the consolidating step has been completed.

10. A method for forming an optical preform, comprising:
depositing silica-based soot on a bait rod to form a low-index trench region, the silica-based soot deposited such that the trench region has a first density;
forming an inner barrier layer comprising silica around the trench region, wherein the inner barrier layer has a second density greater than the first density;
depositing silica-based soot around the first barrier layer to form an overclad region of the optical fiber preform at a third density, wherein the second density is greater than the third density and a trench-overclad structure comprises the trench region, the inner barrier layer and the overclad region;
removing the bait rod from the trench-overclad structure, wherein the removing step defines a central channel in the trench-overclad structure;
flowing a down dopant-containing gas through the central channel of the trench-overclad structure and sufficiently heating the trench-overclad structure to dope the trench region with the down dopant, and further wherein the barrier layer mitigates diffusion of the down dopant into the overclad region;
forming an outer barrier layer comprising silica in an outer portion of the overclad region prior to the step of flowing the down dopant-containing gas through the central channel, wherein the outer barrier layer has a fourth density greater than the third density and mitigates diffusion of the down dopant from the down dopant-containing gas into the overclad region during the step of flowing the down dopant-containing gas; and
consolidating the trench-overclad structure having the doped trench region to form a consolidated trench-overclad structure having a central channel,
wherein the step of forming the outer barrier layer is conducted by traversing the trench-overclad structure into and out of a furnace hot zone, and
further wherein the outer barrier layer comprises closed porosity and a thickness that ranges from 500 microns to about 3000 microns.

11. The method of claim 10, wherein the down dopant is fluorine the down dopant-containing gas comprises one or both of $CF_4$ and $SiF_4$.

12. The method of claim 10, further comprising the step:
inserting a core cane into the central channel of the consolidated trench-overclad structure.

13. The method of claim 10, further comprising the step:
drawing single-mode or multi-mode optical fiber from the optical fiber preform.

14. The method of claim 10, wherein the second density of the inner barrier layer and the fourth density of the outer barrier layer are greater than about 1.5 $g/cm^3$.

15. The method of claim 10, wherein the second density of the inner barrier layer and the fourth density of the outer barrier layer are greater than about 1.75 $g/cm^3$.

16. The method of claim 10, wherein the inner barrier layer has a thickness that ranges from about 10 to 700 microns.

17. The method of claim 10, wherein the steps of flowing a down dopant-containing gas, forming an outer barrier layer and consolidating the trench-overclad structure are conducted sequentially in a furnace without removal of the trench-overclad structure from the furnace until after the consolidating step has been completed.

* * * * *